Patented June 17, 1952

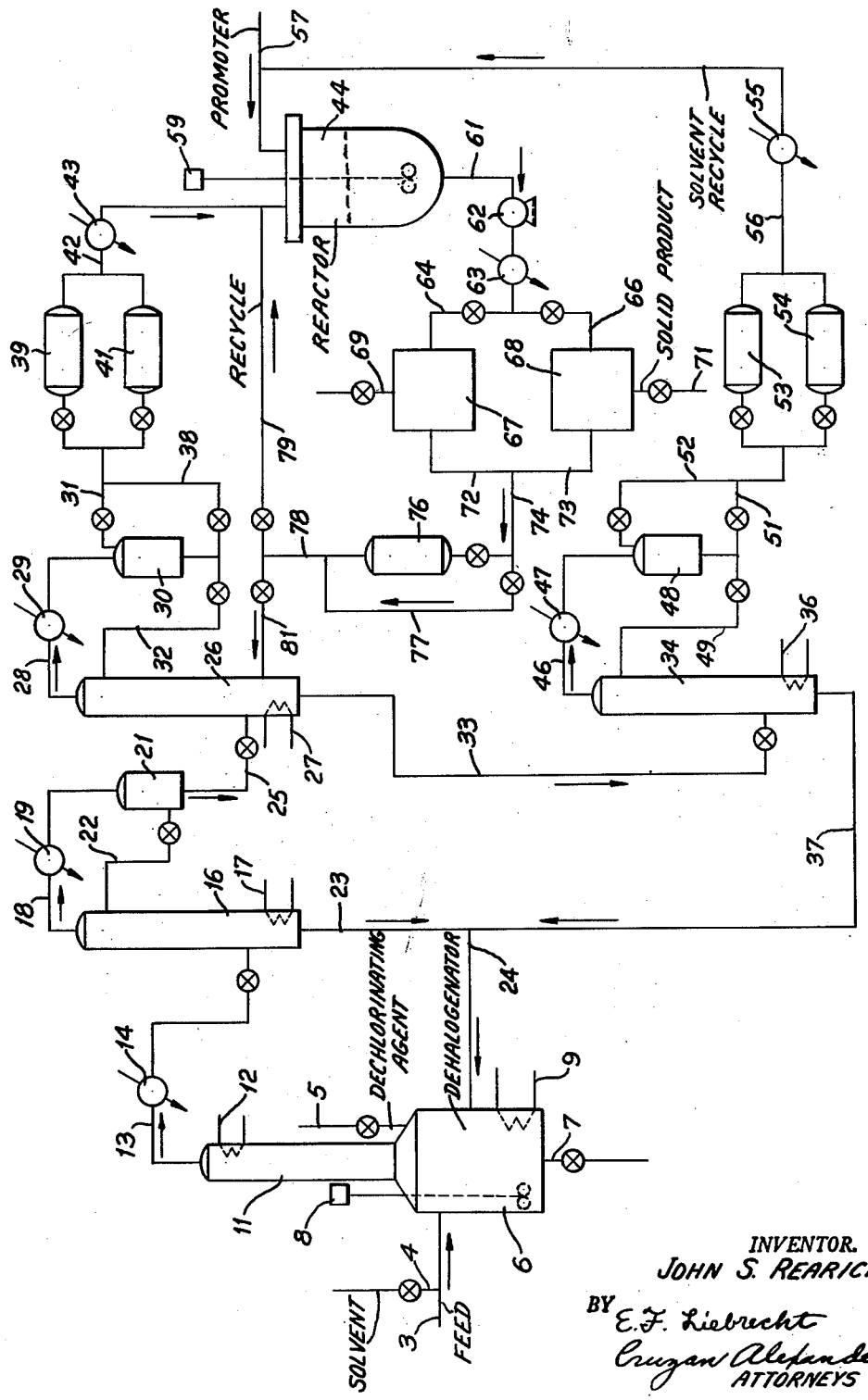

2,600,804

UNITED STATES PATENT OFFICE 2,600,804

PRODUCTION OF CHLOROTRIFLUORO-ETHYLENE POLYMER-IN-MONOMER SLURRY

John S. Rearick, Summit, N. J., assignor to The M. W. Kellogg Company, Jersey City, N. J., a corporation of Delaware Application April 13, 1948, Serial No. 20,612

9 Claims. (Cl. 260—92.1)

This invention relates to the manufacture of perhalocarbons. In one of its aspects this invention relates to the polymerization of perhaloolefins. In another aspect the invention relates particularly to the polymerization of trifluorochloroethylene in a continuous manner to produce a normally solid polymeric compound of high chemical and physical stability.

Under suitable reaction conditions trifluorochloroethylene can be polymerized to produce a normally solid polymer or plastic of good physical and chemical properties and suitable for molding articles of manufacture and for various other uses. At the present time, polymerization of trifluorochloroethylene to produce solid polymers is effected in a batch manner in a bomb type reaction vessel. Accordingly, the monomer is introduced into the bomb together with a suitable promoter and the temperature of the bomb is maintained at about −16 or −17° C. for a period of about seven days. The monomer is converted to a porous plug of the solid polymer in the reaction vessel with approximately 30 to 50 per cent yield of polymer based on the monomer charged. The unreacted monomer is occluded in the interstices of the porous plug and is removed therefrom by heating the reaction vessel under subatmospheric pressure so that the monomer is evaporated from the polymer plug. After the monomer has been thus evaporated, the plug is removed from the reaction vessel and broken into chips or granules.

The apparatus currently employed to effect the process described above is a cylindrical vessel or bomb approximately 6 inches in inside diameter, which is placed in a cooling bath. Because of the poor heat transfer characteristics of the polymer it is necessary to maintain this cooling bath at a temperature materially below the optimum polymerization temperature to avoid overheating of the material in the center of the reaction vessel. Experiments in vessels of smaller diameter have indicated that the bath temperature can be increased, and hence the average temperature of the material, without increasing the maximum temperature of the material at the center of the vessel. Because of the increase of the average temperature, the rate of polymerization is greater, which factor results in a shorter period of time to obtain an economical yield of product. There is also indication that the quality of the solid polymer produced is improved as a result of the greater uniformity of temperature characterized by smaller vessels. However, reduction in the diameter of the vessel reduces the amount of the material which can be produced for a given charge since the length of the vessel must be limited to enable easy removal of the solid polymer from the vessel. It is, therefore, desirable to provide a method and apparatus for overcoming the above difficulties involved in the production of normally solid polymers of trifluorochloroethylene.

The object of this invention is to provide a continuous process for the polymerization of polyfluorochloro-olefins to produce normally solid polymers.

A more specific object of this invention is to provide a process for the manufacture of a normally solid polymer of trifluorochloroethylene.

Still another object of this invention is to provide a method and apparatus for more adequate control of the temperature of reaction in the polymerization of trifluorochloroethylene than is at present practiced.

A further object of this invention is to provide a process and apparatus for the improvement in the quantity and reproducibility of normally solid polymers of trifluorochloroethylene.

It is still a further object of this invention to provide a process to increase the yield of normally solid polymers of trifluorochloroethylene.

Various other objects and advantages of the present invention will become apparent to those skilled in the art from the accompanying description and disclosure.

As herein employed, a perhalocarbon is defined as a compound consisting substantially of carbon and halogen with any degree of saturation. A polyfluorochloro-olefin is defined as a perhalocarbon, particularly a perhalo-olefin with any degree of unsaturation, consisting of fluorine, carbon and as regards this invention not more than one chlorine atom per atom of carbon.

In accordance with the continuous and improved process of this invention, a saturated perfluorochlorocarbon is dechlorinated under suitable conditions of dechlorination in the presence of a metallic dehalogenating agent to produce a perfluorochloro-olefin as a monomer for the subsequent polymerization reaction. The dechlorination reaction is carried out in the presence of a suitable solvent together with a minor proportion of a metal halide, which may be that formed during the dechlorination reaction, and according to the preferred method of operation of this invention the solvent is one which is capable of dissolving the metal halide formed by the dehalogenation reaction and is higher boiling than the monomer produced. An effluent comprising the desired monomer and including unreacted saturated perhalocarbon and solvent is passed to a fractional distillation system in which substantially pure monomer is recovered. Saturated perhalocarbon feed and solvent recovered from the monomer is returned to the dechlorination reaction zone. The monomer after further purification is passed to a polymerization reaction zone in which it is subjected to suitable reaction conditions to convert the monomer to a normally solid polymer. The monomer is maintained in the liquid phase and under a sufficient degree of agitation in the polymerization reaction zone so that the normally solid polymer formed by the reaction, which is insoluble in the monomer, is caused to form a slurry therewith in the reaction zone. In effecting the reaction to produce the solid polymer a suitable catalytic material is used to promote the reaction. A portion of the liquid phase in the polymerization reaction zone is continuously removed therefrom as a slurry containing solid polymer particles and is passed to a filtration zone in which the solid particles are removed and the recovered unreacted monomer is recycled to the polymerization reaction zone. A portion of the monomer recovered from the slurry may be returned to the distillation system for repurification. The solid polymer is recovered as powder or granules and is treated to remove entrained monomer therefrom.

The slurry from the reaction zone is cooled and the rate of withdrawal and degree of cooling is controlled to maintain the reaction zone temperature at the desired value. The fluid nature of the slurry and the agitation in the reaction zone assures uniform temperatures for the polymerization reaction, while the recycle of cooled unreacted monomer removes the heat of polymerization.

For a better understanding of the present invention, reference will be made to the accompanying drawing which diagrammatically illustrates an arrangement of apparatus in elevation which may be used for the production of normally solid polymers of trifluorochloroethylene. The principal pieces of apparatus for effecting the process depicted in the drawing comprises a dehalogenator 6, a polymerization reactor 44, separators 67 and 68 and various purification and separation equipment for purifying and separating materials utilized and produced by the process.

According to the drawing and the process illustrated, trichlorotrifluoroethane of the 1,2,2, chloro-structure, which may be obtained commercially on the open market as Freon 113, is continuously passed through conduit 3 to dehalogenator 6. A metallic dechlorinating agent, such as zinc dust, is continuously or intermittently introduced through conduit 5 into reactor 6. Although zinc is preferred, various metal dechlorinating agents may be used, such as tin, magnesium, and iron, without departing from the scope of this invention. Fresh solvent of the general characteristics previously discussed is continuously or intermittently introduced into feed conduit 3 through conduit 4, or alternatively directly into dehalogenator 6 by means not shown. In the discussion of the drawing, the solvent used in the dechlorination of trichlorotrifluoroethane is methyl alcohol. The amount of metal dechlorinating agent introduced into dehalogenator 6 is equivalent to at least the theoretical amount necessary for removal of two halogen atoms from the halocarbon. Preferably, an excess dechlorinating agent is used in effecting the dechlorinating reaction and the excess may be as much as 100 per cent or more. The amount of solvent may vary depending upon the reaction conditions, the quantity generally being less for superatmospheric than for atmospheric pressures, a suitable quantity for operation at atmospheric pressure being 65 per cent of the weight of the perhalocarbon charged. The mixture of perhalocarbon and solvent is vigorously agitated by conventional means, such as mechanical stirrer 8, to suspend the metal dechlorination agent in the liquid mixture in the lower portion of reactor 6. Required temperatures are maintained in the liquid phase of dehalogenator 6 by conventional means, such as heating or cooling coils 9 or a jacket through which a heat exchange medium is passed at the desired temperature. For a temperature below about 0° C., a light naphtha may conveniently be used. Water may be used for higher temperatures. Outlet conduit 7 is used for discharging the liquid contents of dehalogenator 6.

For the dechlorination of trichlorotrifluoroethane to trifluorochloroethylene, pressures between atmospheric and about 300 or 400 pounds per square inch gage are employed, preferably a pressure between about 20 and about 200 pounds per square inch gage, and a particularly suitable pressure is about 180 pounds per square inch gage. In the preferred form of the invention, the pressure should be such at any given temperature to permit vaporization of the trifluorochloroethylene from the liquid phase in dehalogenator 6 without substantial vaporization of the other constituents of the reaction mixture. A suitable temperature for the dehalogenation is between about 0° C. and 200° C. It is preferred to use a temperature between about 40 and about 150° C., usually about 115° C. for operation at 180 pounds per square inch gage. At the higher temperatures the rate of reaction is increased, which in most instances is desirable. However, excessive temperatures cause undesirable side reactions.

In starting up the dehalogenation reaction a small proportion of a metal halide, such as zinc chloride, is introduced into dehalogenator 6 to promote or start the dehalogenation reaction. The metal halide may be introduced separately, or in admixture with the dehalogenating agent through conduit 5.

Suitable solvents for the dehalogenation step comprise methyl, ethyl, n-propyl, and n-butyl alcohols; dioxane, glycerol, butyl carbitol, and the Cellosolves. Other known solvents complying with the general requirements may be used, if desired, without departing from the scope of this invention. The preferred solvents are methyl alcohol and ethyl alcohol.

Since the temperature and pressure conditions which are maintained in dehalogenator 6 according to the preferred embodiment of this invention are such that the perhalo-olefin formed therein as the desired product is vaporized, the olefin passes upward together with entrained and vaporized saturated perhalocarbons and solvent through a rectification column 11. The major proportion of the perhalocarbon and solvent are retained in the liquid phase in dehalogenator 6. The upper portion of the rectification column 11 is maintained at a temperature substantially lower than the temperature of the liquid phase of dehalogenator 6, preferably at least 20° C. lower. The top temperature of column 11 is maintained at the desired level by indirect heat exchange means 12 or by refluxing a portion of liquefied overhead product. In rectification column 11, methyl alcohol solvent and trichlorotrifluoroethane are condensed and flow downward back into dehalogenator 6, while the monomer is removed therefrom through conduit 13. Since rectification column 11 effects only a partial separation, the vaporous stream in conduit 13 will contain minor amounts of unremoved trichlorotrifluoroethane and methyl alcohol.

A typical composition of the trifluorochloroethylene-containing stream in conduit 13 is shown below in Table I for operation of dehalogenator 6 at a superatmospheric pressure of 87.5 pounds per square inch gage and rectification column 11 at a top temperature of about 24° C.

Table I

| | Vol. per cent |
|---|---|
| Monomer | 98.0 |
| Methyl alcohol | 1.5 |
| $C_2F_3Cl_3$ | 0.1 |
| Other materials | 0.4 |
| | 100.0 |

The monomer-containing stream is passed through conduit 13 to a cooler 14, wherein it is liquefied, and thence to a fractional distillation column 16. As previously mentioned, a portion of the liquefied effluent in conduit 13 may be returned by means not shown to the upper portion of rectification column 11 as liquid reflux therefor to aid in maintenance of the required top temperature.

The subsequent treatment of the effluent in conduit 13 is an important feature of the process since the purification of the monomer trifluorochloroethylene by the removal of the alcohol solvent and saturated perhalocarbon is essential in order to obtain satisfactory yields and reproducible results in the polymerization effected in reactor 44. To effect the purification of the monomer, liquid from conduit 13 is in one embodiment of this invention introduced into fractional distillation column 16. This column is maintained at a temperature and pressure corresponding to that required to pass monomer overhead and to recover the solvent and unreacted saturated perhalocarbon as a bottoms product. If superatmospheric pressures are employed during the dehalogenation in unit 6, the pressure of the liquid in conduit 13 may be decreased upon introduction into distillation column 16 to aid in the fractional distillation and lower the temperatures required therein. Both atmospheric and superatmospheric distillations are feasible and in some cases superatmospheric distillation may be preferred. A top temperature of about −20° C. is appropriate for atmospheric distillation in column 16. Indirect heat exchange element 17 is provided in the lower portion of column 16 as a means for controlling the temperature of the bottoms product, the temperature of which is about 15° C. at atmospheric pressure. Element 17 may comprise an internal coil within column 16 or a conventional external reboiler. Upon distillation, the monomer is removed from column 16 through conduit 18 together with a relatively minor proportion of unremoved saturated halocarbon and also in some cases small amounts of methyl alcohol. The vaporous effluent is passed through conduit 18 to a conventional cooler or condenser 19 wherein the effluent is condensed. From cooler 19, the effluent is passed to an accumulator 21 in which condensate is collected. A portion of the condensate is returned to column 16 through conduit 22 as liquid reflux therefor. Internal cooling means (not shown) may be positioned within the upper portion of column 16 to aid in refluxing of the distillation column and may be used in addition to, or alternatively to, condensate returned through conduit 22.

The bottoms product from distillation column 16 is removed therefrom through outlet conduit 23 and is returned by means of a pump (not shown) through conduits 23 and 24 to dehalogenator 6. The bottoms product comprises the major proportion of the solvent and saturated perhalocarbon in the monomer-containing stream of conduit 13.

Analysis of a typical overhead product of column 16 when it is operated at a top temperature of about −20° C. and a kettle temperature of about 15° C. at atmospheric pressure indicates the presence of less than about one per cent of impurities, such as methyl alcohol and trifluorotrichloroethane.

A portion of the stream in conduit 23 may be discarded by means not shown in order to prevent the build-up of contaminants in the system, such as by-products and polymers formed during the dehalogenation. Liquid can also be withdrawn directly from dehalogenator 6 through outlet conduit 7 for the above purpose.

In some instances it may be desirable to use a soluble stabilizer or inhibitor to prevent oxidation and/or polymerization of the monomer during distillation and storage. Such soluble inhibitors comprise a tertiary amine or terpene.

Condensate from accumulator 21 is passed through conduit 25 to a second fractional distillation column 26 in which solvent and unreacted perhalocarbon are removed from the monomer. In column 26 the control of temperature and pressure conditions is more selective than in column 16 in order to make a closer cut between the monomer and the undesired components, such as the solvent and saturated perhalocarbon. The temperature and pressure are selected such that the monomer is removed overhead through conduit 28 and is passed through a cooler 29 to an accumulator 30. Condensate at a temperature of about −28° C. is returned to the top of column 26 through conduit 32 as reflux. Solvent and saturated perhalocarbon are removed as a bottoms product through an outlet conduit 33. When operating at approximately atmospheric pressure the top temperature of column 26 is about −26° C. and the kettle temperature of column 26 is about −20° C. Element 27 comprises a conventional heat exchange means, such as an internal coil or an external reboiler, for maintaining the desired temperature at the bottom of column 26. A refrigerant, such as a light naphtha, is circulated through coils 27 at about −15° C. Solvent and unreacted monomer from reactor 44 which have been separated from the solid polymer product in separators 57 and 58 are introduced into the lower portion of column 26 through conduit 81. The solvent used in the polymerization for dissolving the polymerization promoter and its recovery will be discussed more fully hereinafter. Since the polymerization solvent is also higher boiling than the monomer, it is removed with the bottoms product through outlet conduit 33.

For operating distillation column 26 at a top temperature of —26° C. and at a kettle temperature of about —20° C. at atmospheric pressure and for low temperature polymerization to produce a solid polymer, analysis of a typical monomer overhead fraction indicates the presence of less than 0.005 volume per cent of impurities, such as methyl alcohol. The bottoms product from column 26 comprises as its major component trichlorofluoromethane, the solvent used in the polymerization step.

The liquid bottoms product from distillation column 26 continuously passes through conduit 33 to a third fractional distillation column 34 in which the solvent used in the polymerization step, such as $CCl_3F$, is separated from saturated perhalocarbon ($C_2F_3Cl_3$) and solvent (methyl alcohol) used in the rehalogenation reaction. Temperature and pressure conditions of distillation column 34 are such that trichlorofluoromethane is passed overhead while trichlorotrifluoroethane and any remaining methyl alcohol are removed as a bottoms product. When using atmospheric pressure in distillation column 34, the kettle temperature will be about 48° C. and the overhead temperature will be about 27° C. for separating trichlorofluoromethane from trichlorotrifluoroethane. For superatmospheric pressures higher temperatures are used. The trichlorotrifluoroethane-containing bottoms product is removed from column 34 through outlet conduit 37 and is continuously returned by means of a pump (not shown) through conduit 24 to dehalogenator 6. Element 36 is a conventional heat exchange means, such as an internal coil or external reboiler, for controlling the kettle temperature of distillation column 34. The overhead product comprising trichlorofluoromethane and less than about one per cent of the other components of the feed is removed from column 34 through conduit 46, a portion of which overhead may be condensed in a conventional cooler 47 and returned through conduit 49 to the upper portion of column 34 as reflux therefor. The treatment of the overhead product of column 34 and its return to reactor 44 will be discussed more fully subsequently.

The overhead product from the second distillation column 26 in conduit 28 comprises monomer and traces of contaminants, such as methyl alcohol or other oxygen-containing compounds. This vaporous stream in conduit 28 is passed through a conventional cooler 29 in which the vapors are cooled and condensed and resulting condensate is passed from cooler 29 to an accumulator 30. Condensate which is collected in accumulator 30 is returned through conduit 32 to the upper portion of distillation column 26 as liquid reflux for controlling the top temperature thereof. Alternatively or in addition to refluxing with condensate from conduit 32, internal cooling means (not shown) may be positioned within the upper portion of column 26 for causing internal refluxing.

If only that much of the vapors in conduit 28 are condensed as to provide reflux to column 26, the remaining vapors are removed from accumulator 30 through conduit 31 and are passed through treaters 39 and 41, which are used alternately, to remove oxygen-containing compounds. While one treater is being used, the other treater is being filled with fresh treating agent or sorbent material or the sorbent material therein is being regenerated. Treaters 39 and 41 contain suitable material for removing traces of methyl alcohol and other oxygen-containing compounds present in the gaseous stream. Suitable treating agents or sorbents comprise phosphorous pentoxide, silica gel, activated carbon, and mixtures thereof; however, various other sorbents may be used which are known to those skilled in the art. Treaters 39 and 41 are used since a monomer of high purity is required in the polymerization of trifluorochloroethylene at a low temperature to produce a normally solid polymer of good physical and chemical properties. Preferably, treaters 39 and 40 contain alternate layers of phosphorous pentoxide and silica gel.

After passage of the monomer stream through treaters 39 or 41, the stream is passed through conduit 42 to cooler 43 wherein the gaseous stream is cooled and condensed. From condenser or cooler 43, condensate at the desired temperature is passed to reactor 44. It is advantageous although not necessary to provide a cooled holding tank (not shown) to aid in the regulation of the flow of monomer to reactor 44.

To treat the monomer stream in the liquid condition in treaters 39 and 41, cooler 29 is operated such that substantially the entire effluent stream in conduit 28 is condensed. Condensate from accumulator 30 is then passed through conduit 38 to treaters 39 and 41, which are operated as described with respect to vapor phase operations. In this modification, cooler 43 may be omitted; however, cooler 43 may be used to further cool the condensate to the desired polymerization temperature after passage through treaters 39 and 41 without departing from the scope of this invention.

Various methods and procedural steps for recovery and purification of the monomer may be practiced, although each method or procedure is not necessarily equivalent to the others. The steps for recovery and purification of the monomer depicted in the drawing is only one of several which may be followed to obtain a monomer of sufficient purity for producing a solid polymer of good physical and chemical characteristics. For example, the monomer-containing stream in conduit 13 may be treated with $P_2O_5$ prior to fractional distillation thereof and subsequent to distillation the monomer concentrate stream is treated with silica gel. The successive steps of treating the monomer stream with $P_2O_5$, distillation, and treating with silica gel renders a monomer of high purity. Another procedure consists of the steps of treating the monomer-containing stream of conduit 13 with $P_2O_5$ and then with silica gel. This latter procedure has been found satisfactory for purifying the monomer for subsequent polymerization to solid polymers without distillation. According to the procedure described with reference to the drawing, one of the distillation columns 16 or 26 may be eliminated without departing from the scope of this invention. The choice of the recovery and purification procedure used will depend upon the economic evaluation as well as such factors as the purity of the monomer desired, etc.

In reactor 44 liquid trifluorochloroethylene is polymerized in the presence of an organic peroxide promoter to produce a solid polymeric material having good chemical and physical characteristics as a plastic. A particularly suitable promoter for the production of a solid product is bis-trichloroacetyl peroxide. The amount of trichloroacetyl peroxide used varies between about 0.01 and about 0.15 per cent of the monomer in the reaction mixture, a preferred concentration being about 0.03 per cent.

Bis-trichloroacetyl peroxide may be prepared by reacting sodium peroxide with trichloroacetyl chloride at a temperature of about −15° C. The bis-trichloroacetyl peroxide product is extracted from the resulting mixture with trichlorofluoromethane. Bis-trichloroacetyl peroxide is then recovered from the trichlorofluoromethane by crystallization.

Various other organic peroxides, such as trifluoroacetyl peroxide, difluorochloroacetyl peroxide, benzoyl peroxide, chloracetyl peroxide, and dichlorofluoroacetyl peroxide have been found capable of promoting the desired polymerization reaction to produce a normally solid polymer of trifluorochloroethylene.

Since the peroxide promoter is solid under normal conditions and substantially insoluble in the monomer, a solvent is used to dissolve the promoter and the resulting solution of the promoter is injected into reactor 44 through conduit 57. The use of the promoter as a solution facilitates handling and intimate mixing of the promoter with the monomer in the reaction zone. The preferred solvent is one which is non-reactive and has a boiling point higher than the boiling point of the monomer. The quantity of solvent containing the promoter employed is usually between about 1 and about 20 per cent of the monomer feed but larger or smaller amounts may be used without departing from the scope of this invention. The preferred solvent of the present invention is trichlorofluoromethane. The solution of promoter is maintained at a sufficiently low temperature prior to introduction into the reactor to minimize decomposition.

A solution of promoter is continuously or intermittently introduced into reactor 44 through conduit 57 after being admixed with fresh or recycle solvent from conduit 56. Alternatively the solution of promoter may be injected into conduit 42 for admixture with the monomer by means not shown. For the production of a normally solid polymer a temperature between about −20° C. and about 150° C. is employed depending upon the promoter and other operating conditions used. Generally, however, somewhat higher temperatures can be used in the process of this invention than are possible for the batch-wise processes described previously. With a bis-trichloroacetyl peroxide promoter a temperature between about −20 and about 25° C. is preferred. The pressure should be at least in excess of the vapor pressure of the monomer at the polymerization temperature employed.

The solid polymer of trifluorochloroethylene is formed as fine particles suspended in the liquid monomer because of its insolubility therein. The formation of the polymer as fine particles may be predicated to the fact that trifluorochloroethylene polymerizes by nuclei growth. It is believed that the polymerization of the monomer to the solid polymer is accomplished in a relatively short period of time and that the quantity of polymer produced over a period of time is limited by the rate of formation of the polymer nuclei. As a result the bulk of monomer does not progressively polymerize in entirety. This theory is offered merely as a means for better understanding the present invention and is not to be construed as limiting the invention or as the only explanation thereof.

Reactor 44 comprises a steel vessel and may be provided with cooling coils or a cooling jacket (not shown) for aiding in the maintenance of the desired temperature therein. The form of the reaction vessel is immaterial from the standpoint of this invention and the vessel may be in the form of elongated tubes or coils through which the reaction mixture flows as a turbulent mixture. As shown in the drawing, however, the reaction vessel is an enlarged zone in which is contained a substantial quantity of liquid monomer containing suspended solid polymer. In the enlarged vessel shown, the solid polymer is maintained in suspension by means of a conventional mechanical stirrer 59. Stirrer 59 also aids in maintaining uniform temperature throughout the liquid phase in the reaction vessel 44. The stirrer 59 may be omitted if the liquid circulation within the vessel is sufficiently great to maintain the polymer suspended in the liquid monomer, such as the circulation caused by withdrawal and introduction of liquid.

In using a reaction coil or tube of restricted cross section, the flow through the reaction tube causes sufficient turbulence or agitation to maintain the solid particles of monomer suspended in the reaction mixture.

In accordance with this invention, a slurry of monomer and solid polymer is removed at the desired rate from reactor 44 and passed through conduit 61 by means of pump 62 to cooler 63. The slurry is cooled in cooler 63 to a temperature at least 5° C. below the temperature of reactor 44 so that when the unreacted monomer is recycled, the temperature of the reaction vessel is maintained substantially constant at the desired value by controlling the amount of heat removed in cooler 63. From cooler 63 the cooled slurry is passed through either one of separating zones 67 and 68 through conduits 64 and 66, respectively. Separation units 67 and 68 are used alternately. While one separating zone is on process flow the solid polymer is being removed from the other separating zone. Any of the conventional filter means may be used for separating the solid polymers from the unreacted monomer. Such filter means may comprise a conventional plate and frame filter press, a leaf filter, a rotary continuous filter, such as those disclosed in "Elements of Chemical Engineering," Badger and McCabe, McGraw Hill Book Company (1936), second edition. When a continuous filter is used, dual filters are unnecessary. On the other hand, separators 67 and 68 may comprise a settling zone in which the solid polymer is settled from the monomer and accumulates in the bottom of the settling vessel from where it is removed through a suitable star valve or the like. In the diagrammatic illustration shown in the drawing, the solid polymer is removed from separators 67 and 68 through outlet conduits 69 and 71, respectively.

Unreacted monomer is passed from separators 67 and 68 through conduits 72 and 73, respectively, and is recycled to reactor 44 through conduits 74, 78 and 79. A portion of the recycled monomer is returned to distillation column 26 through conduit 81 in order to repurify the monomer. Usually the ratio of the amount of monomer recycled to that diverted to distillation column 26 is about 1:1 to about 10:1 by volume or higher, preferably a ratio of about 3:1 to about 4:1.

Since acidic impurities, such as trichloroacetic acid, phosgene and their derivatives, contaminate the monomer-containing stream, it is desirable to remove these contaminants in order to prevent their build-up in the system and to prevent their adverse affect on the physical and chemical qualities of the solid polymer product. Such acidic impurities are removed from the recycle monomer stream by passing the stream through a treater 76 containing a suitable acid absorption medium, such as sodium or potassium hydroxide. A portion of the stream may by-pass treater 76 by means of conduit 77, if desired. If the monomer stream is treated in treater 76 with an aqueous alkali solution, driers (not shown) must be provided for removing traces of aqueous solution from the treated stream.

The monomer-containing stream in conduit 81 contains the solvent used for dissolving the promoter and in the particular embodiment of the invention described the solvent is trichlorofluoromethane. When the monomer-containing stream in conduit 81 is introduced into distillation column 26, the monomer is removed overhead as previously described and the solvent is removed with the bottoms product through outlet conduit 33. This bottoms product from distillation column 26 is passed to a third distillation column 34 as previously discussed. In distillation column 34, trichlorofluoromethane is continuously recovered as an overhead product and is passed through conduit 26 to a conventional cooler 47 in which at least a portion of the vaporous overhead product is condensed. Condensate is then passed to accumulator 48. From accumulator 48 condensate is recycled to the upper portion of column 34 through conduit 49 as liquid reflux therefor. When the entire overhead product is condensed in cooler 47 condensate is passed from accumulator 48 through conduit 51 to treaters 53 and 54 to remove oxygen-containing compounds. When only the amount of overhead required for reflux in column 34 is condensed, the uncondensed overhead product is passed through conduit 52 through treaters 53 and 54. Treaters 53 and 54 are operated similarly and contain similar treating materials as were used in treaters 39 and 41 for removal of traces of methyl alcohol solvent which inhibits the polymerization reaction. As in the case of treaters 39 and 41, treaters 53 and 44 are used alternately, while one is being regenerated or refilled the other is on process flow.

Substantially pure trichlorofluoromethane is returned to conduit 57 for admixture with promoter and for the subsequent introduction into reactor 44 through conduit 57.

Continuous removal of a slurry from reactor 44 and recovery of solid polymer from the slurry is the preferred method of operation in polymerizing trifluorochloroethylene, but other methods may be used without departing from the scope of this invention. For example, a raking or elevating mechanism could be provided in the reaction vessel operating on a sloping bottom to remove the polymer particles as they settle to the bottom. Another modification is a rotating drum containing liquid monomer with a scraping means for removing the deposited polymer from the sides of the rotating drum.

The solid polymeric product recovered at 69 and 71 may be subjected to further treatment such as fluorination, pyrolysis, drying, etc., without departing from the scope of this invention. Various modifications and alterations of equipment, such as elimination of one of the distillation steps, changes in the sequence of purification steps, and changes in the shape and/or size of reactor 44, may be practiced without departing from the scope of this invention. Certain pieces of apparatus and auxiliary equipment, such as liquid level controls, flow controls, temperature and pressure controls, valves, pumps, coolers or condensers and storage facilities have been omitted from the drawing as a matter of convenience and clarity.

Having described my invention, I claim:

1. A continuous process for polymerizing trifluorochloroethylene to produce a normally solid polymer of good physical and chemical characteristics which comprises the successive steps of introducing liquid trifluorochloroethylene and a solution of trichlorofluoromethane and trichloroacetyl peroxide into a reaction zone, the amount of trichloroacetyl peroxide being between about 0.01 and about 0.15 per cent of the monomer charged, polymerizing trifluorochloroethylene at a temperature between about $-20$ and about $25°$ C. and a corresponding pressure to maintain the monomer in the liquid phase in said reaction zone to produce particles of solid polymer, agitating the reaction mixture to form a slurry of solid polymer and liquid monomer, continuously withdrawing from said reaction zone a slurry of said monomer and solid polymer, cooling the withdrawn slurry at least $5°$ C. below the prevailing temperature of said reaction zone, separating by filtration solid polymer as the product of the process and unreacted monomer from said slurry, treating at least a portion of the unreacted monomer thus recovered from the slurry with an alkali metal hydroxide to remove acidic impurities therefrom and recycling purified monomer to said reaction zone as feed thereto and as a means for controlling the temperature thereof.

2. A continuous process for polymerizing trifluorochloroethylene to produce a normally solid polymer which comprises the successive steps of introducing trifluorochloroethylene and a solution of trichlorofluoromethane and trichloroacetyl peroxide into a reaction zone, polymerizing trifluorochloroethylene at a temperature between about $-20$ and about $25°$ C. and at a pressure to maintain the monomer in the liquid phase in said reaction zone to produce particles of solid polymer, forming a slurry of solid polymer with liquid monomer in said reaction zone, continuously withdrawing from said reaction zone a slurry of said monomer and solid polymer, cooling the withdrawn slurry below the prevailing temperature of said reaction zone, separating by filtration solid polymer as the product of the process and unreacted monomer from said slurry, treating at least a portion of the unreacted monomer thus recovered from the slurry with an alkali to remove acidic impurities therefrom, and recycling purified monomer to said reaction zone as feed as a means for controlling the temperature thereof.

3. A continuous process for polymerizing trifluorochloroethylene to produce a normally solid polymer of good physical and chemical characteristics which comprises the successive steps of introducing liquid trifluorochloroethylene and a halogenated acyl peroxide which is effective under the polymerization conditions as a promoter into a reaction zone, polymerizing trifluorochloroethylene at a temperature between about $-20$ and about $25°$ C. and a corresponding pressure to maintain the monomer in the liquid phase in said reaction zone to produce particles of solid polymer, agitating the reaction mixture to form a slurry of solid polymer and liquid monomer, continuously withdrawing from said reaction zone a slurry of said monomer and solid polymer, cooling the withdrawn slurry below the prevailing temperature of said reaction zone, separating from said slurry solid polymer as the product of the process and unreacted monomer, and recycling unreacted monomer to said reaction zone as feed thereto and as a means for controlling the temperature thereof.

4. A continuous process for polymerizing trifluorochloroethylene to produce a normally solid polymer which comprises the steps of introducing trifluorochloroethylene into a reaction zone, polymerizing trifluorochloroethylene at a temperature between about −20° C. and about 25° C. in the presence of a halogenated acyl peroxide which is effective in the aforesaid temperature range as a promoter for the polymerization at a pressure to maintain the monomer in the liquid phase in said reaction zone to produce particles of solid polymer, agitating the reaction mixture to form a slurry of solid polymer with the liquid monomer, continuously withdrawing from said reaction zone a slurry of said monomer and solid polymer, cooling the withdrawn slurry below the prevailing temperature of said reaction zone, separating from said slurry solid polymer as the product of the process and unreacted monomer, and recycling cooled unreacted monomer to said reaction zone as feed thereto and as a means for controlling the temperature thereof.

5. A continuous process for polymerizing trifluorochloroethylene to produce a normally solid polymer of good physical and chemical characteristics which comprises the steps of introducing trifluorochloroethylene into a reaction zone, polymerizing trifluorochloroethylene at a temperature between about −20 and about 25° C. in the presence of a halogenated acyl peroxide which is effective in the aforesaid temperature range as a promoter for the polymerization and at a corresponding pressure sufficient to maintain monomer in the liquid phase in said reaction zone to produce particles of solid polymer, withdrawing from said reaction zone a slurry comprising monomer and solid polymer, separating solid polymer as a product of the process and unreacted monomer from said slurry, and recycling said monomer to said reaction zone.

6. The improved process for polymerizing trifluorochloroethylene which comprises introducing trifluorochloroethylene into a reaction zone, in said reaction zone polymerizing trifluorochloroethylene in the presence of trichloroacetyl peroxide as a promoter at a temperature between about −20 and about 25° C. and at a corresponding pressure sufficient to maintain monomer in the liquid phase to produce particles of solid polymer in suspension in liquid monomer at the temperature of polymerization, and separating and recovering particles of solid polymer from the suspension as a product of the process.

7. The improved process for polymerizing trifluorochloroethylene which comprises introducing trifluorochloroethylene into a reaction zone, in said reaction zone polymerizing trifluorochloroethylene at a temperature between about −20 and about 25° C. in the presence of a halogenated acyl peroxide which is effective in the aforesaid temperature range as a promoter for the polymerization and at a corresponding pressure sufficient to maintain monomer in the liquid phase to produce particles of solid polymer in suspension in liquid monomer at the temperature of polymerization, and separating and recovering particles of solid polymer from the suspension as a product of the process.

8. The process of claim 7 in which said organic peroxide promoter is chloroacetyl peroxide.

9. The process of claim 7 in which said organic peroxide promoter is dichlorofluoroacetyl peroxide.

JOHN S. REARICK.

REFERENCES CITED

The following references are of record in the file of this patent:

UNITED STATES PATENTS

| Number | Name | Date |
|---|---|---|
| 2,345,659 | Downes | Apr. 4, 1944 |
| 2,396,791 | Krase | Mar. 19, 1946 |
| 2,531,134 | Kropa | Nov. 21, 1950 |

FOREIGN PATENTS

| Number | Country | Date |
|---|---|---|
| 796,026 | France | Mar. 27, 1936 |

OTHER REFERENCES

Belmore et al., Ind. Eng. Chem., 39, 338–342 (March 1947).